March 23, 1965 M. J. E. GOLAY 3,175,194
ROTARY MEMORY DRUMS
Filed Oct. 30, 1959 3 Sheets-Sheet 1

INVENTOR.
MARCEL J. E. GOLAY
BY
F D Prager
ATTORNEY

INVENTOR.
MARCEL J. E. GOLAY
BY
F D Prager
ATTORNEY

March 23, 1965 | M. J. E. GOLAY | 3,175,194

ROTARY MEMORY DRUMS

Filed Oct. 30, 1959 | 3 Sheets-Sheet 3

INVENTOR.
MARCEL J. E. GOLAY
BY
F. D. [signature]
ATTORNEY

United States Patent Office
3,175,194
Patented Mar. 23, 1965

3,175,194
ROTARY MEMORY DRUMS

Marcel J. E. Golay, Rumson, N.J., assignor, by mesne assignments, to Philco Corporation, Philadelphia, Pa., a corporation of Delaware Filed Oct. 30, 1959, Ser. No. 849,855
2 Claims. (Cl. 340—173)

Figure 1:
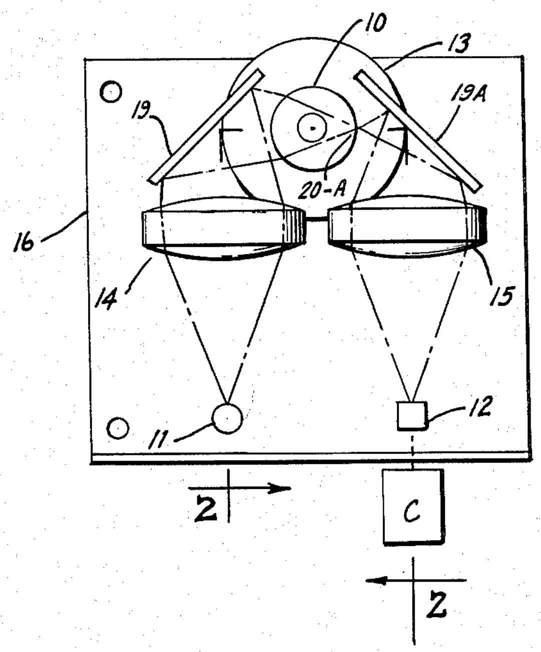

My invention relates to rotary memory drums. It has to do particularly with problems which are encountered when such a drum is installed and rotated on board a guided missile, rocket, or the like.

Builders of missiles, as well as designers of computers, have heretofore attempted to miniaturize the instrumentation which they employ or provide, including the memory units. Extremely small dimensions are required, since a minimum of space is often available. Minimizing of mass is equally important, not only in view of the severe limitations imposed on the pay load, but also on account of the gyroscopic effect, encountered when a massive drum or the like is rotated rapidly.

Although possibilities of miniaturization have been studied intensively, builders of instrumentation of the indicated type are still confronted with requirements for devices of more radically reduced size, mass, and inertial effect. It was therefore a primary object of the invention to provide for substantial reduction of size, mass, and inertia of instrument components, and such reduction was found to be particularly important with respect to rotary memory drums, storing large numbers of programming data.

It has occurred to me that, in the so identified field, new and desirable results can be obtained by a novel structure, which can be said to be based on the principle of optically accessible memory storage. By means of this principle, I provide for storage and utilization of enormous numbers of data elements or "bits," on a drum of greatly reduced bulk and which can safely be allowed to revolve very rapidly. The new apparatus can be constructed and operated so that it not only avoids any significant inertial disturbance, and of course also avoids dangers of centrifugal disruption, but that it yields useful data at a rate up to many thousands of bits per millisecond.

This latter type of operation is several orders of magnitude beyond the capability of the best magnetic drums. Due to inherent fringe effects of magnetic fields, fundatentally larger bits must be used on magnetic drums than can be used in the optical drum device described herein. It is, of course, recognized, on the other hand, that the optical drum has limitations as well as features which are not shared by the magnetic drum; for instance, the optical drum does not allow erasing and rewriting of preformed data as readily as does the magnetic device.

The invention, in one of its broadest aspects, can thus be said to facilitate storage and use of large numbers of data, by means of a small, optical memory storing and reading drum which replaces the inherently somewhat massive, magnetic memory writing, storing and reading drum. As a corollary to this fundamental change, new optical and photo-electrical means have been provided for access to the stored memory.

Additional characteristics, objects and advantages of the invention may be noted from the disclosure which follows and which is schematically illustrated in the drawing appended hereto.

Figure 8:
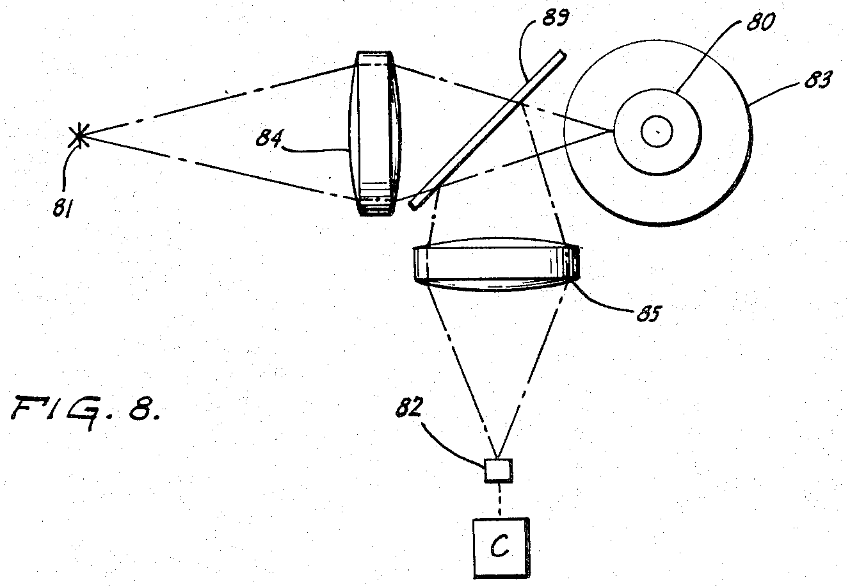
Figures 2, 3, 4, 5:
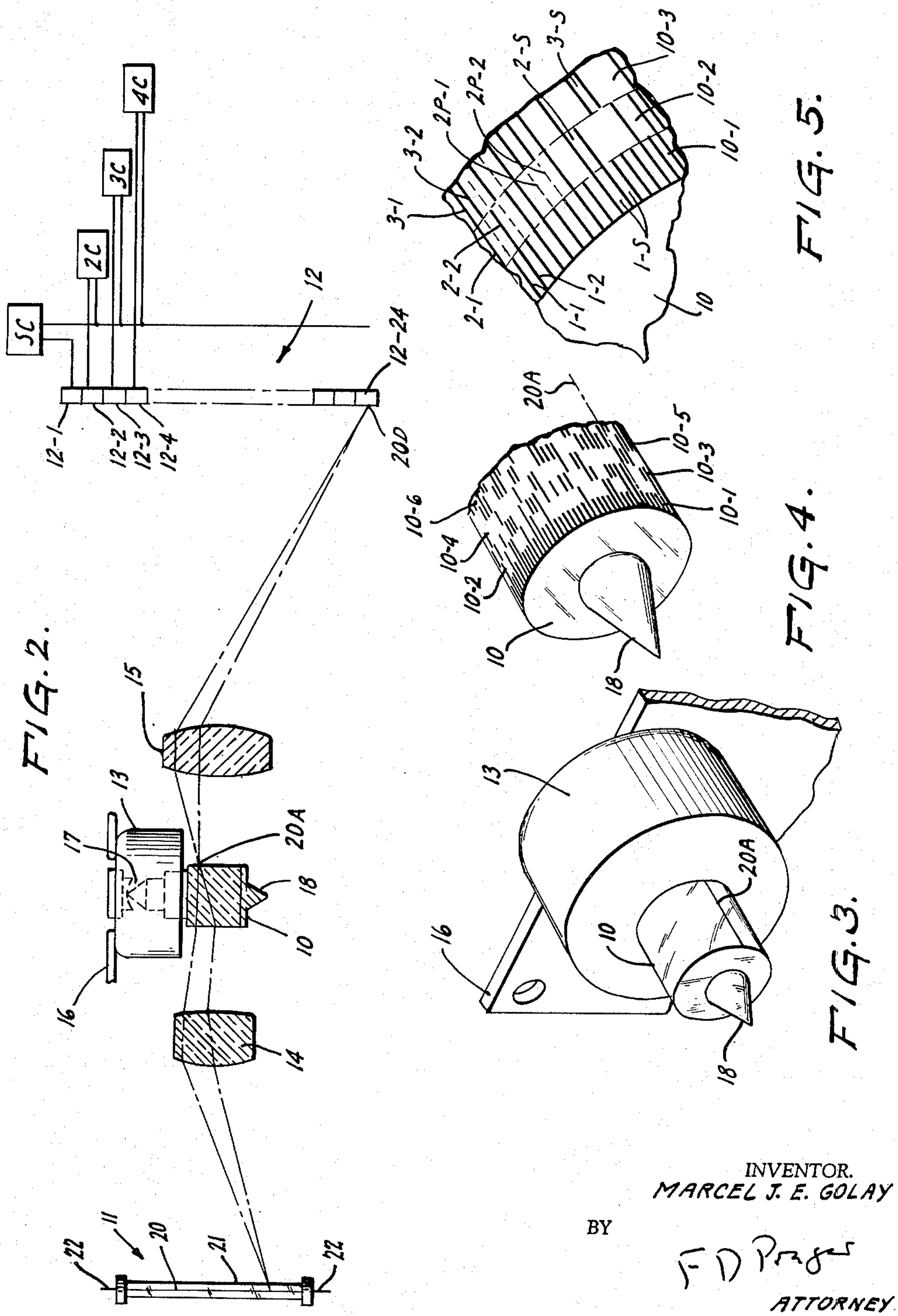
Figure 6:
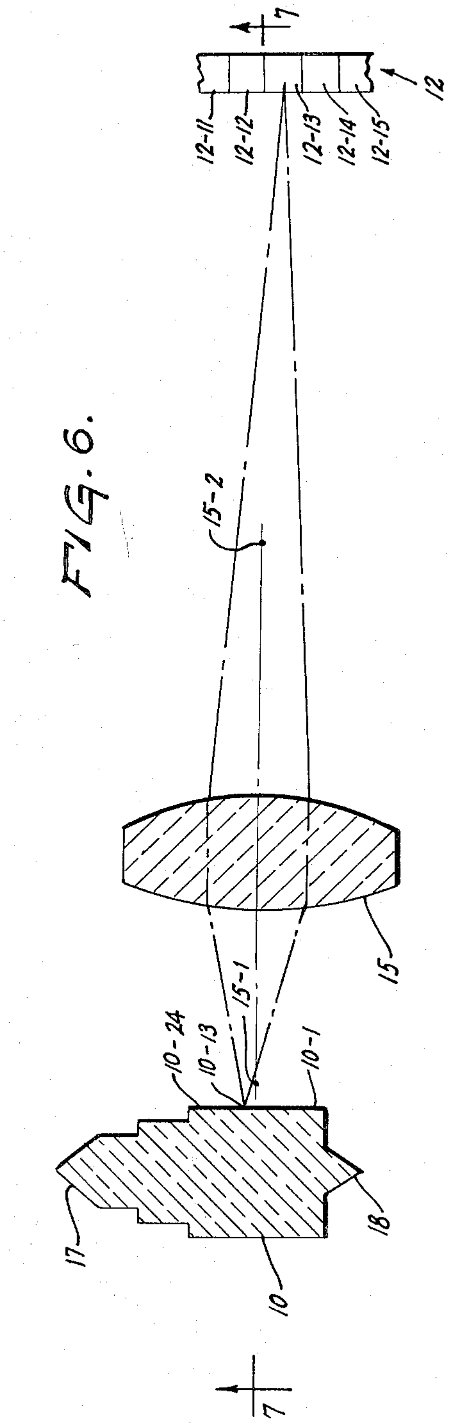
Figure 7:
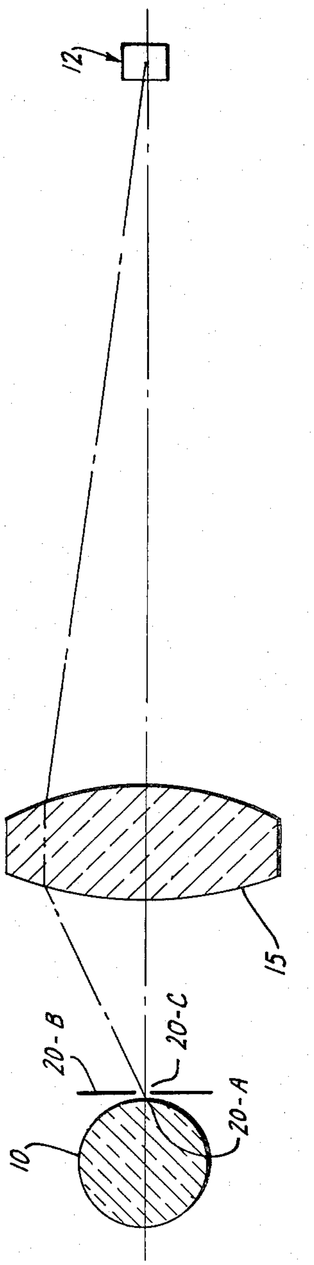

In said drawing, FIGURE 1 is an end view of a preferred embodiment of the invention. FIGURE 2 is a developed or unfolded view thereof, with certain parts broken off, this view being taken in general along line 2—2 in FIGURE 1. FIGURE 3 is a perspective view of a central group of parts of the same apparatus. FIGURE 4 is an enlarged view of a detail shown in FIGURE 3, and FIGURE 5 is an additionally enlarged view of a detail shown in FIGURE 4. FIGURE 6 is an enlarged view of a detail shown in FIGURE 2, while FIGURE 7 is a section through the detail of FIGURE 6, the section being taken along lines 7—7 and being modified in one respect. FIGURE 8 shows another modification of the invention, in a view generally similar to FIGURE 1.

The invention provides for storage of information upon a cylindrical, rotary drum, shown in FIGURE 1 at 10. A narrow surface portion of this drum is illuminated by a light source 11 and analyzed by a group 12 of photoelectrically sensitive devices, such as photocells. The drum is rotated by a suitable rotor, not shown, and which is associated with a motor unit 13. Two optical systems are provided, a first system 14 being interposed between light source 11 and drum 10, while a second system 15 is interposed between drum 10 and photocells 12. For the support of light source 11, photocells 12, motor 13, and optical systems 14, 15, a plate or bracket 16 is provided in the airplane, rocket, missile, or other equipment using the memory unit. In this way, support is also provided for one end of drum 10, which end may engage a bearing 17 in motor 13 (FIGURE 2). The other end of the drum has bearing means 18, which may engage suitable bracket structure, not shown.

The cooperation of the memory drum with other parts or devices may take a great variety of forms, which by themselves are well known to the art. It will suffice to mention that the drum unit may for instance serve to control a more or less complex series of programming functions, in automatic or radio guidance of the vehicle, or in the tracking thereof, or in the handling and relaying of data observed by various instruments. Either one or more of the new drums, or drum units, can be carried by a vehicle and in some instances a plurality of drums 10 can cooperate with a single auxiliary part, such as a single light source 11 and/or photocell unit 12; it being possible, for example, to arrange several drums and photocell units in radial disposition around a single light source. In such cases, the prevention of inertial disturbance is particularly important.

In order to keep a single drum unit as compact as possible, light source 11 and optical system 14 are shown in FIGURE 1 as being disposed closely adjacent the analyzing system 12 and optical system 15. The optical axis of the instrument is accordingly broken or folded, by means of inclined reflectors 19, 19A.

As indicated by FIGURE 2, light source 11 comprises a straight, elongated, incandescent filament 20, disposed in glass tube 21 and energized by terminals 22, both tube and filament being parallel to the axis of drum 10. A variety of other light sources can be provided in or by such a body. The light source can, for instance, conveniently be constructed as a glass tube having an interior space filled with a gas or vapor which fluoresces on application of an electrical potential. In either case, it is possible to utilize some suitable portion of the visible, infrared or ultraviolet spectrum; and it is generally preferred for purposes of the invention to utilize a short spectrum, as provided by a substantially monochromatic light source.

Drum 10 is made of suitable, transparent material, such as sapphire. The arrangement of source 11, optical sys? tem 14 and drum 10 is such that, as indicated by FIGURES 1 to 3, a primary reduced-size image 20A of the light-emitting filament 20 is formed, by lens 14, on the surface of drum 10, this image being substantially in form of a thin, straight line. The light utilized for forming said image or line, which light is derived from source 11 and guided by optical elements 14, 19, is refracted as it passes through the transparent drum 10, so that image line 20A is formed on that side of the drum which is relatively adjacent to the second reflector 19A and the analyzing photocells 12.

As further indicated by FIGURE 2, the so established, primary light source image 20A is picked up by the second optical system 15, to form an ultimate image 20D of the light source on photocells 12. Advantageously, the second optical system 15 differs from lens 14 in that it provides magnification, particularly in the plane of FIGURE 2, while lens 14 provides reduction, particularly in the plane normal to said figure. For the stated purposes, both optical systems can for instance comprise "simple microscopes" or lenses, with spherically ground surfaces, as is best shown in FIGURE 1. However, it is also possible for instance to operate with a point source of light, instead of elongated filament 20, and primary optics 14 would then be modified accordingly, as will be understood by persons skilled in the optical art, on consideration of this disclosure.

The information stored on sapphire drum 10, and which is optically utilized with the aid of light source image 20A, FIGURE 3, comprises a system of markers or so called bits, shown in FIGURES 4 and 5 and advantageously formed in the most minute size which can be produced and microscopically resolved. Because of their smallness, these bits of stored information are not to be seen in FIGURE 3, which represents my preferred computer drum on a slightly enlarged scale. The figure does indicate the position of the aforementioned, primary source image 20A, by means of a thin black line. Actually, the width of this image should be similar to the minute width of a storage marker or bit, which is thinner than the line shown. Also, the actual line, providing a light source image, is of course bright rather than black.

Information stored on drum 10 is, as mentioned, shown in the additionally enlarged FIGURE 4. The cylindrical drum is here illustrated as having a generally white surface (representing the light transmitting material) and as having annular tracks 10-1, 10-2, etc. of dark (light absorbing or diffusing) markers formed thereon, certain markers being indicated in the drawing by lines 1-1, 1-2, etc. in track 10-1, similar lines 2-1, 2-2, etc. in track 10-2, etc. Such markers can be formed in very small sizes and can still provide sharply delineated and accurately resoluble, optical data bits, free of any significant fringe effect. They can be formed, for instance, by scribing or photographic marking techniques.

Thus it is possible to condense the storage of bits to a much greater extent than is possible by any magnetic technique, and incidentally also to a much greater extent than is schematically shown in the drawing. In some cases, it is true, a drum may have only a small number of tracks, and/or a small number of bits in a track. The invention is, however, characterized by the fact that it allows comprehensive bit storage on a small drum; it is not limited to numerically specified ways of utilization of this possibility. Limiting quantitative considerations arise merely from the combined requirements of:

(1) Providing sufficient contrast of light and dark, within individual bit areas, to allow optical resolution and, by suitable illumination, to insure the required signal to noise ratio in the photocell unit; and (2) Marking the bids on the cylindrical drum surface, by means of available tools and methods, so as to provide a precise, geometrical arrangement of the bits, for instance by arranging them along lines parallel to the axis of the drum, as suggested in the drawing.

In a typical application of the new invention, the drum may for instance measure half an inch in diameter and half an inch in length, said length being divided into 24 tracks, each providing 5000 bit areas spaced about the periphery of the drum. Each bit can then have a width of about one-tenth of a mil, measured in the direction of rotation of the drum, while the minimum spacing 1-S, 2-S, 3-S, etc., in the direction of rotation, is advantageously somewhat greater than said width. Each bit marker is desirably of a length facilitating formation thereof, and also insuring a high signal to noise ratio in the analyzing photocell; for instance the marker may be twenty mils long in the direction of the axis of drum 10. A drum, having such markers thereon and having the dimensions indicated above, can be rotated with success as well as safety to provide a reading-out of stored information at the rate of many thousands of bits per millisecond. Heretofore, comparable rates of access to information, by rotation of a drum, would have required storage apparatus of vastly greater size and inertial bulk.

In accordance with the above mentioned use of 24 tracks, FIGURE 2 indicates provision of 24 photocells 12-1 to 12-24, forming parts of analyzing system 12. By virtue of the image elongating effect of lens 15, the data stored on the short drum 10 are distributed over a line-up of photocells, extending along the direction of the axis of drum 10. In some cases it may be desirable in lieu of the straight, single line-up which is shown, to use for instance curved and/or staggered arrangements of photocells, in accordance with the imaging geometry of a suitable magnifier system 15.

One of the data tracks, identified as track 10-1 in FIGURES 4 and 5, is shown as having bit markers 1-1, 1-2, etc. uniformly arranged over the entire peripheral extension thereof, with identical interval spaces 1-S therebetween. This track can be used effectively as a timing or synchronizing means, providing control impulses for a synchronizing photocell 12-1 (FIGURE 2) and thereby for a synchronizing circuit SC. This circuit in turn synchronizes the operation of read-out circuits, such as 2C, 3C, which cooperate, through their photocells 12-2, 12-3, etc., with the information storage tracks 10-2, 10-3, etc. Circuit SC may be controlled additionally by other elements, not shown, for instance under the guidance of radio-controlled equipment.

The information storage tracks 10-2 etc. are shown as having many, if not all, of their marker lines separated by wider spaces, providing empty bit positions 2P-1, 2P-2, etc. corresponding to and in line with certain of the synchronizing markers 1—1, 1-2, etc. The empty or unoccupied positions are indicated in FIGURE 5 by broken lines, in the interest of clarity of disclosure; on the actual drum 10, however, they are desirably left in the form of plain, light transmissive surface portions.

Opaque markers or lines 2-1, 2-2, 3-1, 3-2, etc. may serve as "one-bits," in a binary system of digital data storage, and intermediate transparent bit spaces 2P-1, etc. then serve as "zero bits" of said system; all of said bits being arranged in alignment with synchronizing bits or lines 1-1, 1-2, etc. of track 10-1. The same system can of course be interpreted also as providing "Yes" and "No" bits. The drum can be provided also with additional, special tracks (not shown), for instance a track providing a starting signal for a counting operation, as is known to persons skilled in the art of computers.

By means of read-out circuitry SC, 2C, etc. (FIGURE 2), the "one-bits" and "zero-bits" of the described system can readily be used for purposes of memory access. Confusion of the "zero bits" 2P-1, 2P-2, etc. (FIGURE 5) with the intervening spaces 2-S, 3-S, etc. is prevented by the basically known utilization of the synchronizing circuit SC, which has substantially the same effect as if drum 10 were intermittently moved from a rest position (for instance with line 1—1 at 20A) to another rest position (with line 1-2 at 20A), and as if reading system 12 were switched "on" in such rest positions only. In reality, the drum rotates without interruption; however, it need not rotate with strictly uniform speed.

The rotation of drum 10 exposes "one-bits" and "zero bits" of the information storage tracks 10–2, 10–3, etc., in rapid succession, to the data-analyzing system 12, by means of light derived from source image 20A and modulated by passage of said bits. The stored data of each track, such as 10–3, are thus successively transferred to a corresponding, photo-electrically sensitive device, in this case, device 12–3. This transfer is performed by optical system 15, in the way generally illustrated in FIGURE 2.

The optics of said system are more completely shown in FIGURES 6 and 7, particularly as to some of the more central photosensitive devices, 12–11 to 12–15. Track 10–13 is indicated in FIGURE 6 as being located slightly above the optical axis; and it will be seen that a side-reversed, magnified image thereof, located below the optical axis, is provided by lens 15 in the plane of analyzing system 12. For this purpose the illuminated surface area of drum 10 is disposed adjacent to the first focus 15–1 of said lens, while system 12 is disposed beyond the second focus 15–2 of said lens.

At those exact moments when a synchronizing bit, such as 1—1 or 1–2 (FIGURE 5), passes the illuminated line image 20A (FIGURE 3), the corresponding modulation of the light, received in the synchronizing cell 12–1, causes synchronizing circuit SC (FIGURE 2) to enable the read-out circuits 2C, 3C, etc. of all information receiving light-sensitive devices 12–2, 12–3, etc. to operate, whereas said read-out circuits 2C, 3C, etc. are inoperative during the intervening time intervals. Assuming next that, in any one of the information tracks 10–2, 10–3, etc. a "one-bit" or marker passes line 20A, at such an exact moment, this produces a suitable voltage fluctuation in the corresponding read-out cell and circuit 12–2, 12–3, etc., which need not be described in further detail. In this way, rapid and correlated reading-out of the information stored on the drum is provided, although the drum is many times smaller than the smallest drum hitherto employed for comparable purposes.

The substantial advantages of the so provided miniaturization of data storage have been indicated, initially, and it is believed that no further elaboration thereof is required at this point.

Added refinements and/or modifications of the illustrated arrangement can be provided in various ways. For instance it may be noted that in FIGURE 7 there is shown not only a cross-section through the arrangement of FIGURE 6 but, as an added element, a shield or light stop member 20B, having a narrow slit aperture 20C adjacent the position of the illuminated source image line 20A on the surface of the drum 10. The use of such a slit member may be desired in some cases, in order to control diffraction effects, which may be created by the opposite surface area of drum 10. In the latter area the light enters through the interstices between bit marker elements, which elements have, to some extent, the effect of a diffraction grating, thereby causing some of the light to be deflected from the desired line image 20A.

In an even more complete way, effects of the indicated type, as well as problems of spherical aberration and the like, are suppressed in accordance with the modification of FIGURE 8, wherein light, for instance white light, is generated by light source 81, collected by system 84, passed through semireflector 89 which is inclined to the optical axis, and then reflected by (not refracted through) an optical storage drum 80, rotated by motor 83. The drum can in this case be made of opaque material, such as steel; otherwise, it may be similar to the drum of FIGURES 1 to 7. The light is directed onto suitably formed, microscopically visible markers, on drum 80, wherefrom the light is selectively reflected, through system 85, to photoelectrical system 82 for the control of read-out circuits C.

While only a few embodiments of the invention have been described, it should be understood that the details thereof are not to be construed as limitative of the invention except insofar as is consistent with the scope of the following claims.

I claim:

1. Apparatus for relatively extensive storage of data by miniature equipment and for utilization of the stored data with a minimum of inertial effect of moving masses, comprising:

a relatively small drum-shaped body of low inertia, rotatable about its longitudinal axis and having data bits disposed in parallel straight lines on the cylindrical surface thereof;

illuminating means for projecting onto said surface a narrow luminous straight line substantially coextensive with the length of the surface and completely illuminating each successive line of data bits when the body rotates;

a system of photoresponsive elements or cells arranged in a row radially spaced from and appreciably longer than said narrow luminous straight line; and magnifier means focussed upon said luminous line for forming an extended image thereof covering the row of cells and for thus enabling the cells, without axial motion relative to said drum-shaped body, to scan each successive line of data bits when illuminated by said luminous line.

2. Apparatus as described in claim 1 wherein said illuminating means includes a straight incandescent filament, parallel to said axis, and means for focussing an image of said filament, at reduced width, onto said cylinder surface to provide said narrow luminous line.

References Cited by the Examiner

UNITED STATES PATENTS

| | | | |
|---|---|---|---|
| 2,894,064 | 7/59 | Cooley | 340—174 |
| 2,985,872 | 5/61 | Beltrami | 340—347.4 |

IRVING L. SRAGOW, *Primary Examiner.*

E. R. REYNOLDS, N. C. READ, *Examiners.*